Sept. 19, 1944.     P. H. PIERSON ET AL     2,358,348
PRISMATIC OPTICAL OBSERVER
Filed Nov. 28, 1941
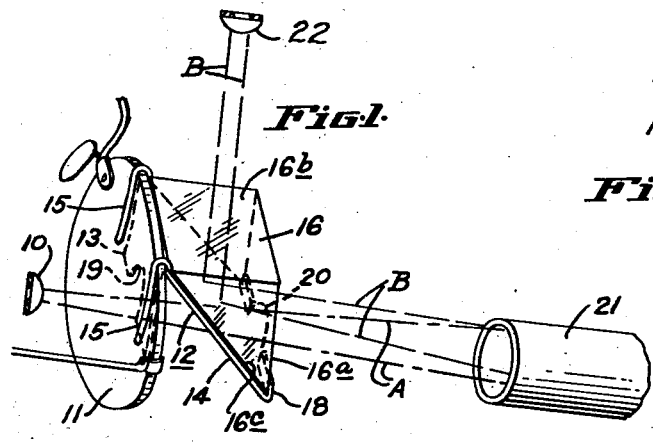
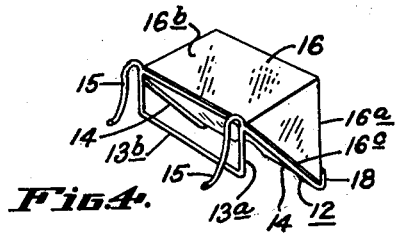
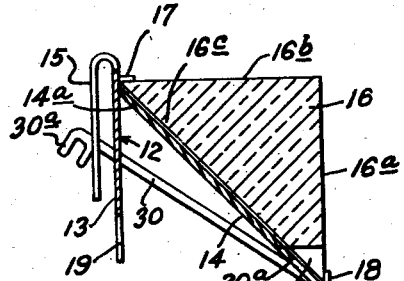
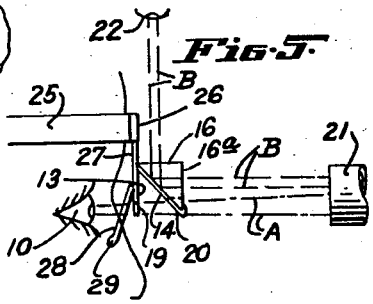
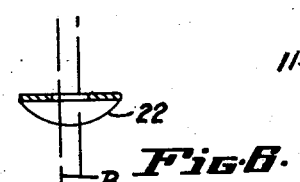
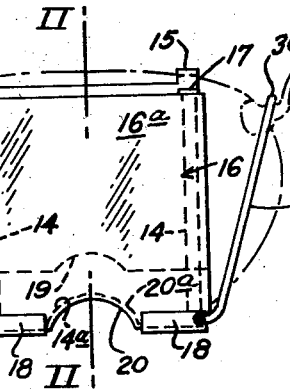
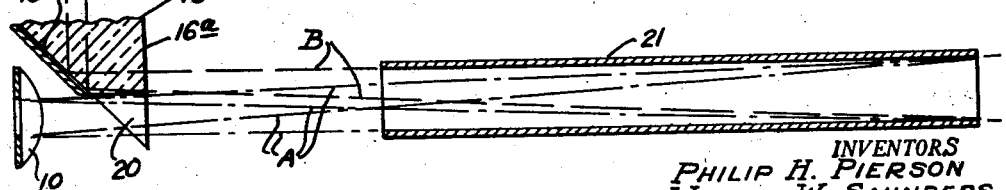
INVENTORS
PHILIP H. PIERSON
WILLIAM W. SAUNDERS
BY
Chas. E. Townsend
ATTORNEY.

Patented Sept. 19, 1944

2,358,348

UNITED STATES PATENT OFFICE 2,358,348

PRISMATIC OPTICAL OBSERVER

Philip H. Pierson and William W. Saunders, San Francisco, Calif., assignors to The Board of Trustees of The Leland Stanford Junior University, Palo Alto, Calif., a corporation of California Application November 28, 1941, Serial No. 420,838

7 Claims. (Cl. 88—41)

This invention relates to prismatic optical reflecting apparatus and more particularly to such devices adapted to employment in the surgical field in connection with the surgical use of endoscopes, specula, such as bronchoscopes, sigmoidoscopes, and the like.

Among the objects of the invention are to provide an improved optical device for use in viewing internal cavities of the body through other tubular surgical devices in spaced relation of the operator's eye, so that an operator may have unobstructed vision through the tubular surgical device and yet have space for convenient use of surgical operating and illuminating instruments which may be inserted through the tubular device, and simultaneously to provide for observation by one or more other persons of the same object or zone which is under inspection or treatment by the operator.

A further object is to provide an optical device which may be supported by the head of an operator so as to move with the operator's head and providing him with a direct line of vision to the object to be viewed and having incorporated therewith a reflecting prism for receiving incident rays for reflection to an observer.

A further object is to provide an optical device for employment for vision of both an operator and an observer in envisioning an object through an endoscope in which a changeable, removably mounted reflecting prism may be employed to meet any reflective or refractive desires of the observer, while not interfering with or changing in any manner the vision of the operator, whether the vision of the operator be normal without correction, or be corrected with lenses to meet his own particular optical idiosyncrasies.

For the reasons above stated, the invention herein is described and illustrated as having modifications of structure which adapt the invention to support by a headband of an operator who does not use spectacles, and also to an operator who does employ corrective spectacles, the latter manner of use being probably the most usual and, therefore, described in relatively greater detail.

With the foregoing and other objects in view, all of which will be more apparent as this description proceeds, the invention is exemplified in one form in the novel construction and combination of parts hereinafter described, illustrated in the accompanying drawing, and pointed out in the claims hereto appended, it being understood that various changes in the form, proportion, size, and minor details of construction of the device may be resorted to within the scope of the appended claims without departing from the spirit or sacrificing any of the advantages of the invention.

To more clearly explain the invention, reference is directed to the accompanying drawing wherein:

Fig. 1 is a perspective of one exemplification of the invention.

Fig. 2 is a transverse section on line II—II of Fig. 3.

Fig. 3 is a front elevation of the invention as illustrated in Figs. 1 and 2, showing optional stabilizing side clips.

Fig. 4 is a perspective view of one modified form of the invention.

Fig. 5 is a side elevation of a second modified form of the invention.

Fig. 6 is a diagrammatic illustration of incident and reflecting rays in the employment of the invention in connection with a tubular surgical apparatus.

Fig. 7 is a diagrammatic illustration, showing relative areas for direct vision of operator and the area of impingement of incident rays at front elevational view of the apparatus.

Referring to the drawing in which like reference characters indicate corresponding parts in the several views, 10 represents the eye of an operator who, as shown in the embodiment in Fig. 1, employs corrective ocular lenses 11 in spectacles of the usual type. Upon one of the lenses 11 there is mounted a prism holding frame, generally indicated 12, comprising an opaque plate 13 which superficially contacts the optical spectacle lens 11, preferably the outer face thereof farthest removed from the eye of the operator.

Connected with the plate 13 are forwardly extending supporting bracket members 14, relatively spaced and disposed at a downwardly inclined angle of substantially 45 degrees to the plate 13, the plate 13 and the bracket members 14 being connected adjacent to their upper edges. The supporting frame 12, consisting of the plate 13 and bracket members 14, is removably mounted on the upper edge of the optical lens 11 by means of relatively spaced spring clips 15 at the opposite ends of the upper edge portion of the joined plate 13 and bracket members 14, these clips looping over the upper edge of the spectacle lens and engaging the rear face thereof. An opaque plate 14ª extends transversely between the bracket members 14 in a plane slightly below or depressed from the plane of the brackets 14, so that the plate 14ᵃ will be slightly spaced adjacent to the reflecting face of a prism hereafter described.

Mounted upon the relatively spaced bracket members 14 is a reflecting prism, generally indicated 16, of clear transparent material, such as optical glass, having a front face 16ᵃ for receiving direct incident rays, and an upper face 16ᵇ in a plane substantially perpendicular to the face 16ᵃ, which upper face may be called the observer's sight face. The prism 16 is triangular in transverse section, as shown in Fig. 2, the faces 16ᵃ and 16ᵇ being preferably disposed at 90 degrees relatively and the hypotenuse or reflecting face 16ᶜ being in spaced relation to the opposed face of the opaque plate 14ᵃ which is mounted in transverse underlying spaced relation to said hypotenuse or reflecting prism face 16ᶜ.

The prism 16 may be permanently fixed upon the supporting bracket members 14 in any suitable manner; but it is preferred that it be removable for cleaning and polishing thereof. To that end, the prism in the present exemplification is supported upon the bracket members 14 and maintained thereon by engagement of an angular edge of the prism under resilient ears 17 adjacent to the spring clip members 15 and being supported at its lower edge by a retroverted flange 18 at the lower free end of brackets 14.

In order that the prism may readily be snapped into place, the bracket members 14 may be made of slightly resilient spring metal or plastic. By thus providing a removable prism, it may not only be cleaned and burnished, but separate prisms may be employed having faces relatively disposed at varying angles so that advantage may be taken not only of reflection but also of refraction in the event that a different angle of vision were desired for the observer.

In order that the normal vision of the eye 10 of the operator may not have interference from the reflecting device, and in order that the operator will automatically and unconsciously maintain his head in such position that his line of vision will be maintained in a proper manner so that the observer will simultaneously have reflected view of the object, provision is made for alignment of vision of the operator. For this purpose there is provided centrally of the lower edge of the opaque plate 13 a cut-out arcuate portion 19; and aligned with the radial axis of normal line of vision from the operator's eye 10 through the cut-out 19, there is also an arcuate cut-out portion 20 in the lower angular edge portion of the prism member 16, a corresponding cut-out 20ᵃ being made in the spaced plate 14ᵃ and the supporting flange 18 in the zone of the cut-out 20.

From the foregoing it will be observed that when the reflecting device as an entirety is mounted upon the spectacle of the operator, as shown in Fig. 1, the eye 10 of the operator may have direct vision through the aligned cut-outs 19, 14ᵃ and 20 and into the open sight end of any type of endoscope or tubular surgical instrument of the scope type, such as generally indicated 21, without his line of vision passing through the prism at all (see broken lines A, Figs. 1 and 5). At the same time, because of the alignment of the cut-outs 19 and 20, the operator will automatically and unconsciously maintain the prism in such position that the incident rays from the endoscope will also impinge upon the face 16ᵃ just above the cut-out 20 and will be transmitted to the reflector face 16ᶜ and thereby be reflected, according to well recognized principles of physics, through the observation face 16ᵇ to the eye of the observer 22 (see broken lines B, Figs. 1, 5 and 6). The prism 16 is preferably positioned relative to the line of vision of the operator, so that the incident rays will impinge on front face 16ᵃ just above the line of vision of the operator through the cut-out 20, as best shown in Fig. 7 wherein a cross-hatched circle 20ᵇ indicates the area of impingement of incident rays.

Fig. 4 illustrates a modification of the supporting frame 12, in which the support or holding function of the frame 12 is accomplished by a transverse wire frame 13ᵃ, which may be an integral continuation of the fixed ends of the clip members 15 and which may be bent upon itself to form the cross-bar portion 13ᵇ to engage the front face of the operator's spectacles, the spring clips 15 being arcuately curved to engage the rear face of the operator's spectacles.

In Fig. 5 there is shown a modified form of the invention, in which there is provided means for supporting the device by means of a headband, in the event that the operator does not himself use corrective lenses in spectacles. In this modification, the headband 25 may be of the usual elastic type, having a plate 26 at the forward portion thereof and having a depending bracket 27, the lower free end of which comprises an opaque plate 13 corresponding to the opaque plate member 13, Fig. 1. The frame, preferably that portion comprising the opaque member 13, has a depending finger 28 provided at its free end with a ball or pad 29 to rest against the bridge of the operator's nose to steady the device. If desired, the depending finger 28 may take the form of the usual arcuate nose-piece resting upon the bridge of the nose of the operator.

Various types of means may be provided to assist in preventing inadvertent movement of the support 12 and prisms 16 relative to spectacles.

In Fig. 3 there is illustrated one form of a support, consisting of struts 30 engaged at one end to the flanges 18 of bracket members 14 and having relatively small hooks 30ᵃ at the opposite ends to engage the frame portion of the spectacles.

It will thus be seen that the prismatic optical device permits the operator to move his head appreciably and also permits the observer to make observation without being so close to the head of the operator as to interfere with the work being performed. It will also be observed that the operator may space his head from the tubular surgical device 21 at a sufficient distance so that operating or illuminating instruments may be conveniently employed through the opening of the tube, as contrasted with the known devices in this art, wherein the observer and operator are required to look through lenses which are connected to, and incorporated as, a part of the structure of an end portion of the surgical scope device itself.

Having thus described the invention, we claim:

1. An optical reflecting device which enables an observer to share simultaneously the same unobstructed field of vision with an operator comprising a transparent prism adapted for receiving incident rays through a face thereof, said prism having a reflecting surface for receiving the incident rays thereagainst and reflecting them to the observer's station, means for supporting said prism adjacent to the eye of an operator, said prism having a lower angle edge removed from the eye of the operator when the device is operatively mounted adjacent to the eye of an operator, and said lower angle edge having a cut-out portion through which the line of vision of the operator may pass unobstructedly to a viewed object, and the said supporting means including an opaque plate spaced rearwardly relative to the prism and having a cut-out portion whereby the vision of the operator may be aligned through the cut-out portions of both the opaque plate and lower angular edge of the prism toward an object to be viewed.

2. An optical reflecting device which enables an observer to share simultaneously the same unobstructed field of vision with an operator comprising a transparent prism adapted for receiving incident rays through a face thereof, said prism having a reflecting surface for receiving the incident rays thereagainst and reflecting them to the observer's station, means for removably supporting said prism adjacent to the eye of an operator, said prism having a lower angle edge removed from the eye of the operator when the device is operatively mounted adjacent to the eye of an operator, and said lower angle edge having a cut-out portion through which the line of vision of the operator may pass unobstructedly to a viewed object, and the said supporting means including an opaque plate spaced rearwardly relative to the prism and having a cut-out portion, whereby the vision of the operator may be aligned through the cut-out portions of both the opaque plate and lower angular edge of the prism toward an object to be viewed.

3. An optical reflecting device which enables an observer to share simultaneously the same unobstructed field of vision with an operator comprising a transparent prism adapted for receiving incident rays through a face thereof, said prism having a reflecting surface for receiving the incident rays thereagainst and reflecting them to the observer's station, means for supporting said prism adjacent to the eye of an operator, whereby the line of vision of the operator to a viewed object may be unobstructed by said prism, and the said supporting means including an opaque plate spaced rearwardly relative to the prism and having a cut-out portion, whereby the vision of the operator may be aligned through the cut-out portions of both the opaque plate and lower angular edge of the prism toward an object to be viewed.

4. An optical reflecting device which enables an observer to share simultaneously the same unobstructed field of vision with an operator comprising a transparent prism adapted for receiving incident rays through a face thereof, said prism having a reflecting surface for receiving the incident rays thereagainst and reflecting them to the observer's station, means for supporting said prism adjacent to the eye of an operator, said means including clip members for engaging spectacles worn by the operator, and said prism having a lower angle edge removed from the eye of the operator when the device is operatively mounted adjacent to the eye of an operator, and said lower angle edge having a cut-out portion through which the line of vision of the operator may pass unobstructedly to a viewed object.

5. An optical reflecting device which enables an observer to share simultaneously the same unobstructed field of vision with an operator comprising a transparent prism adapted for receiving incident rays through a face thereof, said prism having a reflecting surface for receiving the incident rays thereagainst and reflecting them to the observer's station, means for supporting said prism adjacent to the eye of an operator, said means including clip members for engaging spectacles worn by an operator, said prism having a lower angle edge removed from the eye of the operator when the device is operatively mounted adjacent to the eye of an operator, and said lower angle edge having a cut-out portion through which the line of vision of the operator may pass unobstructedly to a viewed object, and the said supporting means including an opaque plate spaced rearwardly relative to the prism and having a cut-out portion, whereby the vision of the operator may be aligned through the cut-out portions of both the opaque plate and lower angular edge of the prism toward an object to be viewed.

6. An optical reflecting device which enables an observer to share simultaneously the same unobstructed field of vision with an operator, comprising a transparent prism adapted for receiving incident rays through a face thereof, said prism having a reflecting surface for receiving the incident rays thereagainst and reflecting to the observer's station, means for supporting said prism adjacent to the eye of an operator, said means including clip and strut members for engaging spectacles worn by the operator, and said prism having a lower angle edge removed from the eye of the operator when the device is operatively mounted adjacent to the eye of an operator, and said lower angle edge having a cut-out portion through which the line of vision of the operator may pass unobstructedly to a viewed object.

7. An optical reflecting device which enables an observer to share simultaneously the same unobstructed field of vision with an operator, comprising a transparent prism adapted for receiving incident rays through a face thereof, said prism having a reflecting surface for receiving the incident rays thereagainst and reflecting them to the observer's station, and means associated with said prism for mounting said prism adjacent to the eye of an operator against relative movement between the locus of said eye and said prism, said prism having a lower angle edge removed from the eye of the operator when the device is operatively mounted adjacent to the eye of an operator, and said lower angle edge having a cut-out portion through which the line of vision of the operator may pass unobstructedly to a viewed object.

PHILIP H. PIERSON.
WILLIAM W. SAUNDERS.